(No Model.)

T. LEACH.
COVER FOR PICKLE JARS AND OTHER RECEPTACLES.

No. 253,726. Patented Feb. 14, 1882.

WITNESSES:
Thos. Houghton.
Amos W. Hart

INVENTOR:
Thomas Leach
BY
ATTORNEYS.

UNITED STATES PATENT OFFICE.

THOMAS LEACH, OF TAUNTON, MASSACHUSETTS, ASSIGNOR TO REED & BARTON, OF SAME PLACE.

COVER FOR PICKLE-JARS AND OTHER RECEPTACLES.

SPECIFICATION forming part of Letters Patent No. 253,726, dated February 14, 1882.

Application filed January 9, 1882. (No model.)

*To all whom it may concern:*

Be it known that I, THOMAS LEACH, of Taunton, in the county of Bristol and State of Massachusetts, have invented a new and useful Improvement in Covers for Pickle-Jars and other Receptacles; and I do hereby declare that the following is a full, clear, and exact description of the same.

It is desirable that the covers of jars of pickle-casters and analogous articles of tableware shall be, first, permanently connected with the caster, so that they may not become misplaced or lost, and, second, shall yet be adapted for being removed from and replaced on the jars quickly and conveniently, and, third, shall present an ornamental appearance when swung off the jars. To these ends I have devised the improvement hereinafter described, in which the cover is attached to a curved or crank rod, that is adapted to slide vertically in a tubular guide forming a fixed portion of the frame of the caster and located above the jars, as and for the purpose hereinafter specified.

Figure 1:
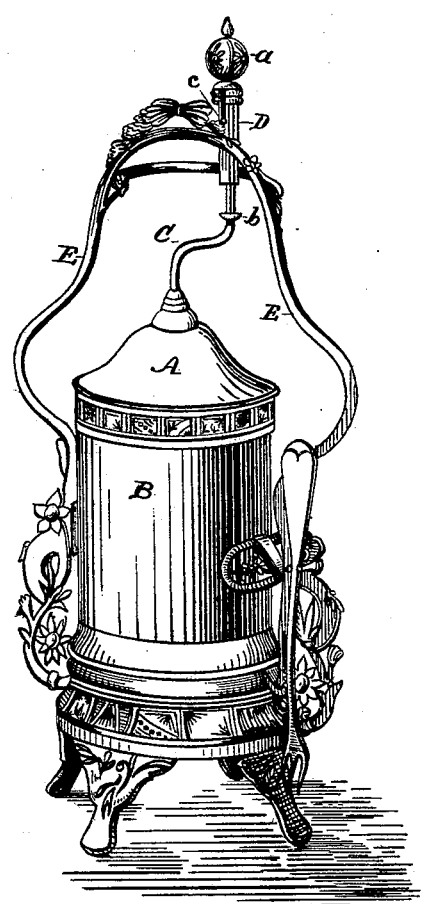
Figure 2:
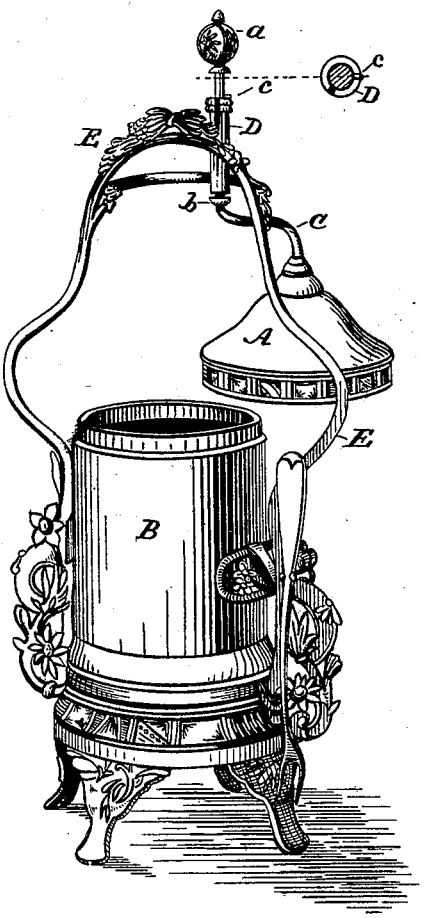

In the accompanying drawings, forming part of this specification, Figures 1 and 2 are perspective views of a pickle-caster embodying my improvement, the cover being shown closed in the one case and open or swung off the jar in the other.

The conical cover A of the jar B is permanently attached to the lower end of the hinge-rod C, which is curved laterally, and whose straight upper portion is adapted to slide and rotate in the tubular guide D. The latter is a fixed attachment of a bow or handle, E, by which the caster is lifted and carried. The said guide is, however, located at one side of the vertical center of the jar B and the rod curved laterally to a corresponding degree. In Fig. 1 the cover A is shown in place on the jar B. To remove it therefrom, the knob *a* on the upper extremity of the rod is seized and the latter drawn up until arrested by the shoulder *b* (formed on its middle portion) coming in contact with the lower end of the guide D, when the cover will have been lifted clear of the jar. Then by rotating said knob *a* the cover will be swung laterally off the jar, thus leaving its contents exposed and easy of access. To support the cover A when thus removed from the jar, I provide the rod C with a lug or pin, *c*, and the upper end of the guide D with an open vertical slot adapted to receive the same. When the cover is swung off the jar, as shown in Fig. 2, this pin rests on the edge of the guide D and serves as a means of support for the cover, so that it is held elevated slightly above the jar B, and hence in position for being swung back with the greatest ease and dispatch. To do this the knob *a* is turned, and when the pin *c* reaches the slot it drops into it and guides the cover down to its place on the jar.

The above-described invention is obviously applicable to various other forms of receptacles besides jars of pickle-casters.

What I claim is—

1. The combination, with a jar or receptacle, B, of a cover, A, a laterally-curved hinge-rod attached thereto, and having a vertical portion adapted to slide and rotate as specified, and a tubular guide for the latter, which is located above said receptacle, as and for the purpose set forth.

2. The combination, with the jar or receptacle B, of the cover A, the laterally-curved hinge-rod C, having a lateral pin, as specified, and a slotted tubular guide, which is located laterally from the center of the jar and above the same, as specified, whereby in removing and replacing the cover said rod is guided in its vertical movement and the cover is supported above the jar when swung off the same, all as shown and described.

THOMAS LEACH.

Witnesses:
ELISHA T. JACKSON,
F. E. FISKE.